United States Patent
Buckley et al.

(10) Patent No.: US 8,818,449 B2
(45) Date of Patent: Aug. 26, 2014

(54) METHOD AND DEVICE FOR NETWORK SELECTION IN MULTIPLE ACCESS TECHNOLOGIES

(75) Inventors: Adrian Buckley, Tracy, CA (US); Paul Marcus Carpenter, Twickenham (GB); Nicholas Patrick Alfano, Stratford-Upon-Avon (GB); Andrew Michael Allen, Hallandale Beach, FL (US)

(73) Assignee: BlackBerry Limited, Waterloo (CA)

( * ) Notice: Subject to any disclaimer, the term of this patent is extended or adjusted under 35 U.S.C. 154(b) by 198 days.

(21) Appl. No.: 13/282,020

(22) Filed: Oct. 26, 2011

(65) Prior Publication Data

US 2012/0039325 A1    Feb. 16, 2012

Related U.S. Application Data

(62) Division of application No. 11/116,470, filed on Apr. 28, 2005, now abandoned.

(51) Int. Cl.
*H04W 48/00* (2009.01)

(52) U.S. Cl.
USPC .......................... 455/552.1; 370/338; 709/223

(58) Field of Classification Search
USPC .......................... 455/552.1; 370/338; 709/223
See application file for complete search history.

(56) References Cited

U.S. PATENT DOCUMENTS

| | | | |
|---|---|---|---|
| 5,027,388 A | 6/1991 | Bradshaw | |
| 5,420,914 A | 5/1995 | Blumhardt | |
| 5,594,949 A | 1/1997 | Anderson et al. | |
| 5,623,535 A | 4/1997 | Leung et al. | |
| 5,659,601 A | 8/1997 | Cheslog | |
| 5,701,585 A | 12/1997 | Kallin et al. | |
| 5,790,952 A * | 8/1998 | Seazholtz et al. | 455/432.1 |
| 5,862,480 A | 1/1999 | Wild et al. | |
| 5,896,572 A | 4/1999 | Scotton | |
| 5,915,214 A * | 6/1999 | Reece et al. | 455/406 |
| 5,950,130 A * | 9/1999 | Coursey | 455/432.1 |
| 5,953,665 A | 9/1999 | Mattila | |
| 5,974,328 A | 10/1999 | Lee et al. | |

(Continued)

FOREIGN PATENT DOCUMENTS

| | | |
|---|---|---|
| CA | 1270742 | 10/2000 |
| CA | 1430840 | 7/2003 |

(Continued)

OTHER PUBLICATIONS

EPO, Extended Search Report, Application No. 07108490.9; Nov. 2, 2007, 10 pgs.

(Continued)

*Primary Examiner* — Hai V Nguyen
(74) *Attorney, Agent, or Firm* — The Danamraj Law Group, P.C.

(57) ABSTRACT

A method and wireless user equipment (UE) device provide the capability to store network information in a database structure on the wireless user equipment device, with the network information containing network entries arranged by radio access technology. Each network entry contains a radio access network (RAN) identification code and a core network (CN) identification code and has a priority within the radio access technology. The UE device determines a currently preferred order of access technologies and selects a network entry according to the currently preferred order of radio access technologies and the priority of network entries within the radio access technologies.

16 Claims, 9 Drawing Sheets

(56) References Cited

U.S. PATENT DOCUMENTS

| | | | |
|---|---|---|---|
| 5,983,115 A | 11/1999 | Mizikovsky | |
| 5,999,811 A * | 12/1999 | Molne | 455/432.3 |
| 6,044,141 A | 3/2000 | Ho et al. | |
| 6,044,249 A | 3/2000 | Chandra | |
| 6,167,250 A | 12/2000 | Rahman | |
| 6,223,042 B1 | 4/2001 | Raffel | |
| 6,285,868 B1 | 9/2001 | LaDue | |
| 6,324,400 B1 | 11/2001 | Shah et al. | |
| 6,334,052 B1 * | 12/2001 | Nordstrand | 455/411 |
| 6,347,091 B1 | 2/2002 | Wallentin et al. | |
| 6,349,099 B1 | 2/2002 | Larikka et al. | |
| 6,360,097 B1 | 3/2002 | Smith et al. | |
| 6,385,460 B1 | 5/2002 | Wan | |
| 6,404,761 B1 * | 6/2002 | Snelling et al. | 370/352 |
| 6,405,038 B1 | 6/2002 | Barber et al. | |
| 6,477,372 B1 | 11/2002 | Otting et al. | |
| 6,501,951 B2 | 12/2002 | Moore | |
| 6,522,735 B1 | 2/2003 | Fortman et al. | |
| 6,542,716 B1 | 4/2003 | Dent et al. | |
| 6,564,055 B1 | 5/2003 | Hronek | |
| 6,608,832 B2 | 8/2003 | Forslow | |
| 6,611,516 B1 | 8/2003 | Pirkola et al. | |
| 6,625,451 B1 | 9/2003 | La Medica | |
| 6,690,929 B1 | 2/2004 | Yeh | |
| 6,728,267 B1 | 4/2004 | Giese et al. | |
| 6,741,848 B2 | 5/2004 | Timonen | |
| 6,769,000 B1 | 7/2004 | Akhtar et al. | |
| 6,795,708 B1 | 9/2004 | Patel | |
| 6,901,257 B2 | 5/2005 | Kubota | |
| 6,950,655 B2 | 9/2005 | Hunkeler | |
| 6,961,569 B2 * | 11/2005 | Raghuram et al. | 455/435.1 |
| 6,985,733 B2 | 1/2006 | Binzel | |
| 7,072,651 B2 * | 7/2006 | Jiang et al. | 455/432.1 |
| 7,079,499 B1 | 7/2006 | Akhtar | |
| 7,151,938 B2 | 12/2006 | Weigand | |
| 7,171,216 B1 | 1/2007 | Choksi | |
| 7,209,709 B2 | 4/2007 | Miyazaki | |
| 7,277,705 B2 * | 10/2007 | Casaccia et al. | 455/435.1 |
| 7,414,997 B2 * | 8/2008 | Lauer | 370/338 |
| 7,433,689 B2 * | 10/2008 | Ishii | 455/434 |
| 7,519,365 B2 * | 4/2009 | Dorsey et al. | 455/435.1 |
| 7,535,882 B2 * | 5/2009 | Kim | 370/338 |
| 7,814,237 B2 * | 10/2010 | Lee et al. | 710/14 |
| 7,937,083 B2 * | 5/2011 | Oommen | 455/432.3 |
| 7,953,410 B2 * | 5/2011 | Alfano et al. | 455/435.2 |
| 8,023,941 B2 * | 9/2011 | Shaheen et al. | 455/433 |
| 8,185,103 B2 * | 5/2012 | Alfano et al. | 455/432.3 |
| 8,194,826 B2 * | 6/2012 | Bari | 379/45 |
| 8,229,431 B2 * | 7/2012 | Buckley et al. | 455/435.3 |
| 8,238,980 B1 * | 8/2012 | Shusterman | 455/574 |
| 8,301,143 B2 * | 10/2012 | Iwamura et al. | 455/435.3 |
| 8,315,627 B2 * | 11/2012 | Poyhonen et al. | 455/436 |
| 8,346,257 B2 * | 1/2013 | Kazmi et al. | 455/435.3 |
| 8,538,431 B2 * | 9/2013 | Obata et al. | 455/436 |
| 8,611,280 B2 * | 12/2013 | Morera et al. | 370/328 |
| 2001/0006892 A1 | 7/2001 | Barnett et al. | |
| 2002/0059453 A1 | 5/2002 | Eriksson | |
| 2002/0082044 A1 | 6/2002 | Davenport | |
| 2002/0101858 A1 | 8/2002 | Suart | |
| 2002/0102973 A1 | 8/2002 | Rosenberg | |
| 2002/0119774 A1 | 8/2002 | Johannesson et al. | |
| 2002/0168976 A1 | 11/2002 | Krishnan | |
| 2002/0178118 A1 | 11/2002 | Hamilton | |
| 2003/0003922 A1 | 1/2003 | McClure | |
| 2003/0017828 A1 | 1/2003 | Kotzin | |
| 2003/0118015 A1 | 6/2003 | Gunnarsson et al. | |
| 2003/0120541 A1 | 6/2003 | Siann | |
| 2003/0142641 A1 | 7/2003 | Sumner | |
| 2003/0158922 A1 | 8/2003 | Park | |
| 2003/0232595 A1 | 12/2003 | Baker et al. | |
| 2004/0017798 A1 | 1/2004 | Hurtta | |
| 2004/0058679 A1 * | 3/2004 | Dillinger et al. | 455/439 |
| 2004/0076130 A1 | 4/2004 | Uchida et al. | |
| 2004/0087305 A1 | 5/2004 | Jiang et al. | |
| 2004/0093398 A1 | 5/2004 | Tang | |
| 2004/0110523 A1 | 6/2004 | Isii | |
| 2004/0116132 A1 | 6/2004 | Hunzinger et al. | |
| 2004/0162058 A1 | 8/2004 | Mottes | |
| 2004/0165657 A1 | 8/2004 | Simic et al. | |
| 2004/0192304 A1 * | 9/2004 | Casaccia et al. | 455/435.1 |
| 2004/0192306 A1 | 9/2004 | Elkerat et al. | |
| 2004/0192328 A1 | 9/2004 | Giacalone et al. | |
| 2004/0203893 A1 | 10/2004 | Kotzin | |
| 2004/0224689 A1 * | 11/2004 | Raghuram et al. | 455/435.3 |
| 2004/0233868 A1 | 11/2004 | Farnham | |
| 2004/0248585 A1 | 12/2004 | Karacaoglu | |
| 2004/0249915 A1 * | 12/2004 | Russell | 709/223 |
| 2004/0252656 A1 | 12/2004 | Shiu et al. | |
| 2005/0020280 A1 | 1/2005 | Holland et al. | |
| 2005/0055371 A1 | 3/2005 | Sunder et al. | |
| 2005/0063334 A1 | 3/2005 | Fnu et al. | |
| 2005/0070279 A1 | 3/2005 | Ginzberg et al. | |
| 2005/0085182 A1 | 4/2005 | Chuberre et al. | |
| 2005/0130591 A1 | 6/2005 | Bouchired et al. | |
| 2005/0130672 A1 | 6/2005 | Dean et al. | |
| 2005/0141464 A1 | 6/2005 | Willey et al. | |
| 2005/0202828 A1 * | 9/2005 | Pecen et al. | 455/453 |
| 2005/0227720 A1 | 10/2005 | Gunaratnam et al. | |
| 2006/0009216 A1 * | 1/2006 | Welnick et al. | 455/434 |
| 2006/0030318 A1 | 2/2006 | Moore et al. | |
| 2006/0068781 A1 | 3/2006 | Lam | |
| 2006/0072507 A1 | 4/2006 | Chandra et al. | |
| 2006/0073827 A1 | 4/2006 | Vaisanen et al. | |
| 2006/0104211 A1 * | 5/2006 | Islam et al. | 370/252 |
| 2006/0114871 A1 * | 6/2006 | Buckley et al. | 370/338 |
| 2006/0171304 A1 | 8/2006 | Hill | |
| 2006/0217147 A1 * | 9/2006 | Olvera-Hernandez et al. | 455/552.1 |
| 2006/0234705 A1 | 10/2006 | Oommen | |
| 2006/0245392 A1 * | 11/2006 | Buckley et al. | 370/331 |
| 2006/0246899 A1 * | 11/2006 | Buckley et al. | 455/435.2 |
| 2007/0004404 A1 | 1/2007 | Buckley et al. | |
| 2007/0004405 A1 | 1/2007 | Buckley et al. | |
| 2007/0011699 A1 * | 1/2007 | Kopra et al. | 725/22 |
| 2007/0054665 A1 | 3/2007 | Elkarat et al. | |
| 2007/0202875 A1 * | 8/2007 | Dorsey et al. | 455/434 |
| 2007/0268877 A1 | 11/2007 | Buckley et al. | |
| 2007/0270142 A1 | 11/2007 | Willey et al. | |
| 2007/0298790 A1 * | 12/2007 | Ormson et al. | 455/434 |
| 2008/0032736 A1 | 2/2008 | Bari | |
| 2008/0039082 A1 * | 2/2008 | Kim | 455/434 |
| 2008/0139204 A1 * | 6/2008 | Hsieh et al. | 455/436 |
| 2008/0200169 A1 * | 8/2008 | Gao | 455/434 |
| 2009/0156215 A1 * | 6/2009 | Pitkamaki | 455/437 |
| 2009/0222566 A1 | 9/2009 | Murakami | |
| 2010/0156706 A1 | 6/2010 | Farmer | |
| 2011/0176424 A1 * | 7/2011 | Yang et al. | 370/236.2 |
| 2011/0244887 A1 | 10/2011 | Dupray et al. | |
| 2011/0294531 A1 | 12/2011 | Buckley | |
| 2012/0039325 A1 | 2/2012 | Buckley et al. | |
| 2012/0040666 A1 | 2/2012 | Buckley et al. | |
| 2013/0072190 A1 * | 3/2013 | Pitkamaki | 455/436 |
| 2014/0051437 A1 * | 2/2014 | Diachina et al. | 455/434 |
| 2014/0051443 A1 * | 2/2014 | Diachina et al. | 455/436 |
| 2014/0086177 A1 * | 3/2014 | Adjakple et al. | 370/329 |

FOREIGN PATENT DOCUMENTS

| | | |
|---|---|---|
| CA | 2504497 | 5/2004 |
| CN | 1270742 | 10/2000 |
| CN | 1430840 | 7/2003 |
| EP | 0781064 | 6/1997 |
| EP | 1213941 | 6/2002 |
| EP | 1104975 | 7/2004 |
| EP | 1460873 | 9/2004 |
| EP | 1641292 | 3/2006 |
| EP | 1703756 | 9/2006 |
| GB | 2352586 | 1/2001 |
| GB | 2353648 | 2/2001 |
| JP | 2001235532 | 8/2001 |
| JP | 2002236165 | 8/2002 |
| JP | 2002286492 | 10/2002 |
| JP | 2005143088 | 6/2005 |
| KR | 1020040090336 | 10/2004 |

(56) References Cited

FOREIGN PATENT DOCUMENTS

| KR | 1020040096612 | 11/2004 |
|---|---|---|
| SG | 178817 | 3/2012 |
| WO | 0041486 | 7/2000 |
| WO | 2004014862 | 7/2000 |
| WO | 0105174 | 1/2001 |
| WO | 0145446 | 6/2001 |
| WO | 0162034 | 8/2001 |
| WO | 03053086 | 6/2003 |
| WO | 03096578 | 11/2003 |
| WO | 2004014101 | 2/2004 |
| WO | 2004047476 | 6/2004 |
| WO | 2004073338 | 8/2004 |
| WO | 2004077860 | 9/2004 |
| WO | 2004081600 | 9/2004 |
| WO | 2004089031 | 10/2004 |
| WO | 2005002140 | 1/2005 |
| WO | 2005002140 | 2/2005 |
| WO | 2005018140 | 2/2005 |
| WO | 2005027557 | 3/2005 |
| WO | 2006007218 | 1/2006 |
| WO | 2006044024 | 4/2006 |

OTHER PUBLICATIONS

EPO, Communication Pursuant to Article 94(3) EPC, Application No. 07108490.9, Mar. 20, 2008, 1 pg.
EPO, Communication Pursuant to Article 94(3) EPC, Application No. 07108490.9, Feb. 16, 2010, 5 pgs.
EPO, Search Report, Application No. 07111440.9, Sep. 24, 2007, 7 pgs.
EPO, Communication Pursuant to Article 94(3) EPC, Application No. 07111440.9, Dec. 19, 2007, 3 pgs.
EPO, Communication Pursuant to Article 94(3) EPC, Application No. 07111440.9, Nov. 12, 2008, 6 pgs.
EPO, Communication Pursuant to Article 94(3) EPC, Application No. 07111440.9, Apr. 13, 2010, 6 pgs.
EPO, Decision to Grant, Application No. 07111440.9, Feb. 3, 2011, 1 pg.
EPO, Search Report, Application No. 07111443.3, Oct. 2, 2007, 7 pgs.
EPO, Communication Pursuant to Article 94(3) EPC, Application No. 07111443.3, Jan. 31, 2008, 1 pg.
EPO, Communication Pursuant to Article 94(3) EPC, Application No. 07111443.3, Sep. 29, 2008, 3 pgs.
EPO, Extended Search Report, Application No. 07111447.4, Aug. 7, 2007, 8 pgs.
EPO, Communication Pursuant to Article 94(3) EPC, Application No. 07111447.4, Jan. 31, 2008, 1 pg.
EPO, Communication Pursuant to Article 94(3) EPC, Application No. 07111447.4, Nov. 5, 2008, 6 pgs.
EPO, Decision to Grant, Application No. 07111447.4, Oct. 1, 2009, 1 pg.
EPO, Extended Search Report, Application No. 08172106.0, Feb. 11, 2009, 11 pgs.
EPO, Communication Pursuant to Article 94(3) EPC, Application No. 08172106.0, Oct. 7, 2009, 1 pg.
IP Australia, Examiner's First Report, Application No. 2005202767, Jul. 7, 2009, 1 pg.
IP Australia, Notice of Acceptance, Application No. 2005202767, Jul. 5, 2010, 3 pgs.
IP Australia, Examiner's First Report, Application No. 2006202765, Apr. 19, 2010, 2 pgs.
IP Australia, Examiner's Second Report, Application No. 2006202765, Nov. 1, 2010, 2 pgs.
IP Australia, Notice of Acceptance, Application No. 2006202765, May 11, 2011, 3 pgs.
IP India, Examination Report, Application No. 1538/DEL/2006, Dec. 15, 2011, 1 pg.
IP India, First Examination Report, Application No. 1539/DEL/2006, Mar. 5, 2012, 2 pgs.
IPOS, Certification of Grant, Application No. 2006044663, Dec. 31, 2008, 1 pg.
JPO, Notice of Reasons for Rejection, Application No. 2006180361, Aug. 18, 2011, 6 pgs.
JPO, Notice of Reasons for Rejection, Application No. 2006180363, Aug. 19, 2011, 5 pgs.
KIPO, Notice of Allowance, Application No. 1020060038142, Jun. 26, 2013, 3 pgs.
KIPO, Office Action, Application No. 1020060062200, Dec. 26, 2012, 6 pgs.
KIPO, Office Action, Application No. 1020060062202, Sep. 27, 2012, 3 pgs.
KIPO, Notice of Allowance of Patent, Application No. 1020060062202, Feb. 15, 2013, 3 pgs.
SIPO, First Office Action, Application No. 200610110892.6, Jan. 15, 2010, 4 pgs.
SIPO, Second Office Action, Application No. 200610110892.6, Jul. 12, 2010, 4 pgs.
SIPO, Third Office Action, Application No. 200610110892.6, Sep. 10, 2010, 6 pgs.
SIPO, Rejection Decision, Application No. 200610110892.6, Jan. 26, 2011, 8 pgs.
SIPO, First Office Action, Application No. 200610143754.8, Jan. 8, 2010, 8 pgs.
SIPO, Notification of Grant of Rights, Application No. 200610143754.8, Nov. 3, 2010, 2 pgs.
TIPO, Office Action, Application No. 095124093, Jan. 22, 2010, 7 pgs.
TIPO, Decision of the Intellectual Property Office, Application No. 095124093, Oct. 27, 2010, 3 pgs.
TIPO, Office Action, Application No. 095124095, May 30, 2011, 3 pgs.
USPTO, Office Action, U.S. Appl. No. 11/173,040, Sep. 26, 2007, 17 pgs.
USPTO, Office Action, U.S. Appl. No. 11/173,040, Apr. 1, 2008, 12 pgs.
USPTO, Office Action, U.S. Appl. No. 11/173,040, Apr. 6, 2009, 10 pgs.
USPTO, Notice of Allowance and Fee(s) Due, U.S. Appl. No. 11/173,083, Dec. 17, 2012, 7 pgs.
USPTO, Notice of Allowance and Fee(s) Due, U.S. Appl. No. 11/712,536, Dec. 24, 2012, 9 pgs.
USPTO, Interview Summary, U.S. Appl. No. 13/208,048, Mar. 13, 2013, 3 pgs.
USPTO, Office Action, U.S. Appl. No. 13/208,048, May 14, 2013, 21 pgs.
SIPO, Office Action, Application 2006-1007264.2, Jan. 31, 2012, 6 pgs.
USPTO, Office Action, U.S. Appl. No. 13/279,903, Feb. 9, 2012, 26 pgs.
CIPO, Office Action, Application No. 2,545,035, Jul. 11, 2011, 2 pgs.
IP Australia, Notice of Acceptance, Application No. 2006201729, Jul. 13, 2010, 3 pgs.
IP Australia, Notice of Acceptance, Application No. 2006201730, Aug. 1, 2010, 3 pgs.
JPO, Notice of Reasons for Rejection, Application No. 2006122719, Jun. 9, 2011, 4 pgs.
JPO, Notice of Reasons for Rejection, Application No. 2006122719, Oct. 4, 2011, 3 pgs.
JPO, Notice of Reasons for Rejection, Application No. 2006122735, Jun. 9, 2011, 3 pgs.
SIPO, First Office Action, Application No. 200610077264.2, Dec. 5, 2008, 3 pgs.
USPTO, Notice of Allowance, U.S. Appl. No. 11/116,461, Jul. 1, 2011, 7 pgs.
USPTO, Office Action, U.S. Appl. No. 11/116,470, Apr. 15, 2008, 12 pgs.
USPTO, Office Action, U.S. Appl. No. 11/116,470, Oct. 17, 2008, 11 pgs.
USPTO, Office Action, U.S. Appl. No. 11/116,470, Mar. 5, 2009, 6 pgs.
USPTO, Office Action, U.S. Appl. No. 11/116,470, Aug. 12, 2009, 6 pgs.

(56) References Cited

OTHER PUBLICATIONS

USPTO, Office Action, U.S. Appl. No. 11/116,470, Jan. 28, 2010, 8 pgs.
USPTO, Office Action, U.S. Appl. No. 11/116,470, Mar. 28, 2011, 7 pgs.
USPTO, Supplemental Notice of Allowance, U.S. Appl. No. 11/116,470, Sep. 21, 2011, 3 pgs.
IP Australia, Office Action, Application No. 2010241215, Oct. 25, 2012, 3 pgs.
JPO, Office Action, Application No. 2011-2892379, Dec. 6, 2012, 3 pgs.
3GPP, TSG-SA2 Meeting #36, Tdoc S2-034121, PLMN and Core Network Operator Selections, New York, NY, Nov. 28, 2005, 5 pgs.
SIPO, Rejection Decision, Application No. 200610077263.8, Nov. 24, 2011, 5 pgs.
USPTO, Advisory Action, U.S. Appl. No. 11/116,461, Jul. 11, 2007, 3 pgs.
USPTO, Supplemental Notice of Allowance, U.S. Appl. No. 11/116,461, Sep. 21, 2011, 3 pgs.
USPTO, Advisory Action, U.S. Appl. No. 11/116,470, Feb. 2, 2011, 3 pgs.
KIPO, Notice of Allowance, Application No. 1020060038143, Jan. 31, 2013, 1 pg.
USPTO, Office Action, U.S. Appl. No. 13/279,903, Apr. 15, 2013, 13 pgs.
CIPO, Office Action, Application No. 2,545,032, Jul. 18, 2012, 3 pgs.
IP Australia, Examiner's Report, Application No. 2010241215, Aug. 23, 2012, 2 pgs.
KIPO, Office Action, Application No. 10-2006-0038143, Jul. 27, 2012, 8 pgs.
SIPO, Rejection Decision, Application No. 200610077264.2, Jul. 2, 2012, 9 pgs.
CIPO, Office Action, Application No. 2,545,032, Oct. 21, 2008, 2 pgs.
CIPO, Office Action, Application No. 2,545,032, Jul. 15, 2010, 3 pgs.
CIPO, Office Action, Application No. 2,545,035, Feb. 26, 2010, 4 pgs.
EPO, Search Report, Application No. 05252665.4, Sep. 2, 2005, 5 pgs.
EPO, Search Report, Application No. 05252665.4, Sep. 13, 2005, 6 pgs.
EPO, Search Report; Application No. 05252665.4, Mar. 30, 2006, 3 pgs.
EPO, Search Report; Application No. 05252666.2, Aug. 30, 2005, 6 pgs.
EPO, Communication Pursuant to Article 94(3) EPC, Application No. 05252666.2, Apr. 21, 2008, 5 pgs.
EPO, Search Report; Application No. 07120521.5, Dec. 19, 2007, 4 pgs.
EPO, Communication Pursuant to Article 94(3) EPC, Application No. 07120521.5, Aug. 6, 2008, 2 pgs.
EPO, Communication Pursuant to Article 94(3) EPC, Application No. 07120521.5, Apr. 7, 2009, 4 pgs.
EPO, Search Report, Application No. 0951437.2, Apr. 8, 2009, 5 pgs.
IP Australia, Examiner's First Report, Application No. 2006201729, Jan. 6, 2010, 2 pgs.
IP Australia, Examiner's First Report, Application No. 2006201730, Nov. 10, 2009, 4 pgs.
SIPO, Second Office Action, Application No. 20061007264.2, Dec. 24, 2010, 6 pgs.
SIPO, Second Office Action; Application No. 200610077263.8; Aug. 11, 2010, 4 pgs.
SIPO, First Office Action; Application No. 200610077263.8, Mar. 2, 2010, 3 pgs.
TIPO, Search Report, Application No. 095115179, Feb. 1, 2011, 1 pg.
TIPO, Office Action, Application No. 095115179, Mar. 10, 2011, 2 pgs.
TIPO, Search Report, Application No. 095115180, Feb. 22, 2011, 1 pg.
TIPO, Office Action, Application No. 095115180, Feb. 25, 2011, 2 pgs.
USPTO, Office Action, U.S. Appl. No. 11/116,461, Oct. 13, 2006, 10 pgs.
USPTO, Office Action, U.S. Appl. No. 11/116,461, Mar. 29, 2007, 10 pgs.
USPTO, Office Action, U.S. Appl. No. 11/116,461, Sep. 25, 2007, 13 pgs.
USPTO, Office Action, U.S. Appl. No. 11/116,461, Feb. 6, 2008, 15 pgs.
USPTO, Office Action, U.S. Appl. No. 11/116,461, Jul. 2, 2008, 14 pgs.
USPTO, Office Action, U.S. Appl. No. 11/116,461, Feb. 24, 2009, 16 pgs.
USPTO, Office Action, U.S. Appl. No. 11/116,461, May 29, 2009, 15 pgs.
USPTO, Office Action, U.S. Appl. No. 11/116,461, Sep. 17, 2009, 18 pgs.
USPTO, Office Action, U.S. Appl. No. 11/116,461, Jan. 19, 2010, 14 pgs.
USPTO, Office Action, U.S. Appl. No. 11/116,461, Sep. 14, 2010, 14 pgs.
USPTO, Office Action, U.S. Appl. No. 11/116,461, Feb. 14, 2011, 15 pgs.
3GPP, TR 21,905, V 4.4.0, Technical Specification Group Services and System Aspects; Vocabulary for 3GPP Specifications (Release #4), Oct. 31, 2001, 48 pgs.
KIPO, Notice of Allowance, Application No. 10-2006-0062200, Jul. 15, 2013, 3 pgs.
SIPO, Reexamination Office Action, Application No. 200610077263.8, Jul. 19, 2013, 9 pgs.
USPTO, Office Action, U.S. Appl. No. 11/116,470, Jul. 21, 2010, 7 pgs.
USPTO, Office Action, U.S. Appl. No. 11/173,040, Nov. 16, 2009, 12 pgs.
USPTO, Office Action, U.S. Appl. No. 11/173,040, May 14, 2010, 12 pgs.
USPTO, Office Action, U.S. Appl. No. 11/173,040, Nov. 10, 2010, 14 pgs.
USPTO, Office Action, U.S. Appl. No. 11/173,040, Jun. 23, 2011, 13 pgs.
USPTO, Office Action, U.S. Appl. No. 11/173,083, Mar. 25, 2008, 7 pgs.
USPTO, Office Action, U.S. Appl. No. 11/173,083, Jun. 27, 2008, 10 pgs.
USPTO, Office Action, U.S. Appl. No. 11/173,083, Jul. 10, 2009, 12 pgs.
USPTO, Office Action, U.S. Appl. No. 11/173,083, Jan. 22, 2010, 11 pgs.
USPTO, Office Action, U.S. Appl. No. 11/173,083, Dec. 21, 2010, 12 pgs.
USPTO, Office Action, U.S. Appl. No. 11/173,083, Jun. 20, 2012, 11 pgs.
USPTO, Office Action, U.S. Appl. No. 11/712,536, Mar. 9, 2010, 16 pgs.
USPTO, Office Action, U.S. Appl. No. 11/712,536, Aug. 16, 2010, 18 pgs.
USPTO, Office Action, U.S. Appl. No. 11/712,536, Apr. 4, 2011, 18 pgs.
USPTO, Office Action, U.S. Appl. No. 11/712,536, Oct. 26, 2011, 21 pgs.
USPTO, Advisory Action, U.S. Appl. No. 11/712,536, Jan. 3, 2012, 3 pgs.
USPTO, Office Action, U.S. Appl. No. 11/750,417, Jan. 5, 2010, 16 pgs.
USPTO, Office Action, U.S. Appl. No. 11/750,417, May 14, 2010, 17 pgs.
USPTO, Interview Summary, U.S. Appl. No. 11/750,417, Oct. 27, 2010, 3 pgs.
USPTO, Notice of Allowance, U.S. Appl. No. 11/750,417, Apr. 15, 2011, 5 pgs.
USPTO, Notice of Publication, U.S. Appl. No. 13/208,048, Dec. 1, 2011, 1 pg.

(56) References Cited

OTHER PUBLICATIONS

USPTO, Office Action, U.S. Appl. No. 13/208,048, Apr. 5, 2012, 15 pgs.
USPTO, Office Action, U.S. Appl. No. 13/208,048, Sep. 24, 2012, 16 pgs.
USPTO, Notice of Panel Decision from Pre-Appeal Brief Review, U.S. Appl. No. 13/208,048, Jan. 17, 2013, 2 pgs.
USPTO, Notice of Publication, U.S. Appl. No. 13/279,903, Feb. 16, 2012, 1 pg.
USPTO, Final Office Action, U.S. Appl. No. 13/279,903, Jul. 23, 2013, 15 pgs.
CIPO, Office Action, Application No. 2,551,238, Jun. 12, 2009, 4 pgs.
CIPO, Office Action, Application No. 2,551,238, Jan. 25, 2011, 2 pgs.
CIPO, Notice of Allowance, Application No. 2,551,238, Oct. 11, 2011, 1 pg.
CIPO, Office Action, Application No. 2,551,241, Nov. 23, 2009, 4 pgs.
CIPO, Office Action, Application No. 2,551,241, Mar. 9, 2011, 2 pgs.
CIPO, Notice of Allowance, Application No. 2,551,241, Mar. 30, 2012, 1 pg.
CIPO, Office Action, Application No. 2,589,948, Oct. 7, 2009, 3 pgs.
CIPO, Office Action, Application No. 2,589,948, Jul. 12, 2010, 2 pgs.
CIPO, Office Action, Application No. 2,589,948, Sep. 2, 2011, 4 pgs.
CIPO, Office Action, Application No. 2,589,948, May 15, 2012, 2 pgs.
CIPO, Office Action, Application No. 2,589,961, Jul. 6, 2010, 6 pgs.
CIPO, Office Action, Application No. 2,589,961, Jul. 19, 2011, 4 pgs.
CIPO, Office Action, Application No. 2,589,961, Mar. 1, 2012, 4 pgs.
CIPO, Office Action, Application No. 2,589,961, Nov. 28, 2012, 5 pgs.
CIPO, Notice of Allowance, Application No. 2,589,961, May 28, 2013, 1 pg.
EPO, Search Report, Application No. 05254146.3, Nov. 21, 2005, 5 pgs.
EPO, Extended Search Report, Application No. 05254146.3, Feb. 21, 2006, 10 pgs.
EPO, Communication Pursuant to Article 94(3) EPC, Application No. 05254146.3, Jun. 16, 2009, 3 pgs.
EPO, Search Report, Application No. 05254147.1, Nov. 15, 2005, 5 pgs.
EPO, Search Report, Application No. 05254147.1, Feb. 7, 2006, 6 pgs.
EPO, Communication Pursuant to Article 96(2) EPC, Application No. 05254147.1, Feb. 22, 2006, 13 pgs.
EPO, Communication Pursuant to Article 96(2) EPC, Application No. 05254147.1, Dec. 14, 2006, 7 pgs.
EPO, Decision to Grant, Application No. 05254147.1, Feb. 14, 2008, 1 pg.
EPO, Extended Search Report, Application No. 06126929.6, Mar. 8, 2007, 4 pgs.
EPO, Communication Pursuant to Article 96(2) EPC, Application No. 06126929.6, Oct. 25, 2007, 1 pg.
EPO, Extended Search Report, Application No. 07103266.8, Jul. 19, 2007, 8 pgs.
EPO, Communication Pursuant to Article 94(3) EPC, Application No. 07103266.8, Jul. 31, 2008, 4 pgs.
EPO, Communication Under Rule 71(3) EPC, Application No. 07103266.8, Dec. 4, 2012, 6 pgs.
KIPO, Office Action, Application No. 10-2006-0038142, Jun. 19, 2012, 6 pgs.
USPTO, Office Action, U.S. Appl. No. 13/279,903, May 21, 2012, 19 pgs.
EPO, Communication under Rule 71(3) EPC, Application No. 07108490.9, Sep. 23, 2013, 6 pgs.
IP, India, First Examination Report, Application No. 1074/DEL/2006, Sep. 26, 2013, 2 pgs.
USPTO, Final Office Action, U.S. Appl. No. 13/208,048, Sep. 26, 2013, 23 pgs.
USPTO, Notice of Allowance, U.S. Appl. No. 13/208,048, Dec. 6, 2013, 7 pgs.
CIPO, Office Action, Application No. 2,545,035, Dec. 6, 2013, 4 pgs.
IP, India, First Examination Report, Application No. 1073/DEL/2006, Oct. 15, 2013, 2 pgs.
CIPO, Office Action, Application No. 2,545,032, Sep. 10, 2013, 2 pgs.
CIPO, Notice of Allowance, Application No. 2,589,948, Aug. 8, 2013, 1 pg.
USPTO, Notice of Publication, U.S. Appl. No. 13/859,890, Aug. 29, 2013, 1 pg.
CIPO, Office Action, Application No. 2,545,032, Jun. 20, 2014, 3 pgs.
Taiwan, Search Report, Application No. 100120631, Jun. 12, 2014, 1 pg.
USPTO, Office Action, U.S. Appl. No. 13/859,890, Apr. 10, 2014, 12 pgs.

\* cited by examiner

| RAN 302 | Services supported by RAN 304 | Other RANs supported by selected RAN 306 | Core Networks supported by RAN 308 | Services supported by each CN 310 |
|---|---|---|---|---|
| RAN-1 | HSDPA<br>EDGE<br>. . . | RAN-X<br>RAN-Z<br>RAN-Y<br>.<br>WLAN-A<br>WLAN-B<br>. . . | CN-1<br>CN-2<br>CN-3<br>. . . | IMS<br>Presence<br>PoC<br>. . . |
| RAN-2 | EDGE<br>. . . | RAN-Z<br>WLAN-C<br>WLAN-D<br>. . . | CN-4<br>CN-5<br>. . . | IMS<br>. . . |
| . . . | | | | |

FIG. 3

| List name | Priority |
|---|---|
| Operator | 1 |
| Preferred | 1 |
| User | 3 |
| Enterprise | 4 |

| Technology | Bands |
|---|---|
| Technology A | A, B, C |
| Technology B | D, G |
| ⋮ | ⋮ |
| Technology Z | J, K |

| Technology | Bands |
|---|---|
| Technology A | A, C |
| Technology B | D, G |
| ⋮ | ⋮ |
| Technology Z | J, K |

METHOD AND DEVICE FOR NETWORK SELECTION IN MULTIPLE ACCESS TECHNOLOGIES

PRIORITY UNDER 35 U.S.C. §119(e) & 37 C.F.R. §1.78

This nonprovisional application is a divisional application claiming the benefit of the following prior U.S. patent application entitled: "SYSTEM AND METHOD FOR PROVIDING NETWORK ADVERTISEMENT INFORMATION VIA A NETWORK ADVERTISEMENT BROKER (NAB)", filed Apr. 28, 2005, application Ser. No. 11/116,470 in the names of Adrian Buckley, Paul Carpenter, Nicholas P. Alfano and Andrew Allen, which is hereby incorporated by reference.

CROSS-REFERENCE TO RELATED APPLICATION(S)

This application discloses subject matter related to the subject matter disclosed in the following commonly owned co-pending U.S. patent application Ser. No. 11/116,461: "NETWORK SELECTION SCHEME USING A ROAMING BROKER (RB)," filed even date herewith, in the name(s) of: Adrian Buckley, Paul Carpenter, Nicholas P. Alfano, and Andrew Allen, which is hereby incorporated by reference.

FIELD OF THE DISCLOSURE

The present patent disclosure generally relates to communication networks. More particularly, and not by way of any limitation, the present patent application is directed to a scheme for providing network advertisement information via a brokering entity such as a network advertisement broker (NAB).

BACKGROUND

When a wireless network is deployed, there is a need to broadcast an identifier such that a wireless user equipment (UE) device wishing to obtain service can identify the wireless network. In a typical implementation, a single broadcast identifier is provided. However, where the constituent radio access network (RAN), core network (CN) and service network (SN) are segmented and individually identified, such a technique becomes woefully inadequate.

BRIEF DESCRIPTION OF THE DRAWINGS

A more complete understanding of the embodiments of the present patent application may be had by reference to the following Detailed Description when taken in conjunction with the accompanying drawings wherein:

FIG. 3 depicts an exemplary database structure provided as part of a network advertisement broker (NAB) in accordance with the teachings of the present patent disclosure;

DETAILED DESCRIPTION OF THE DRAWINGS

Figure 1:
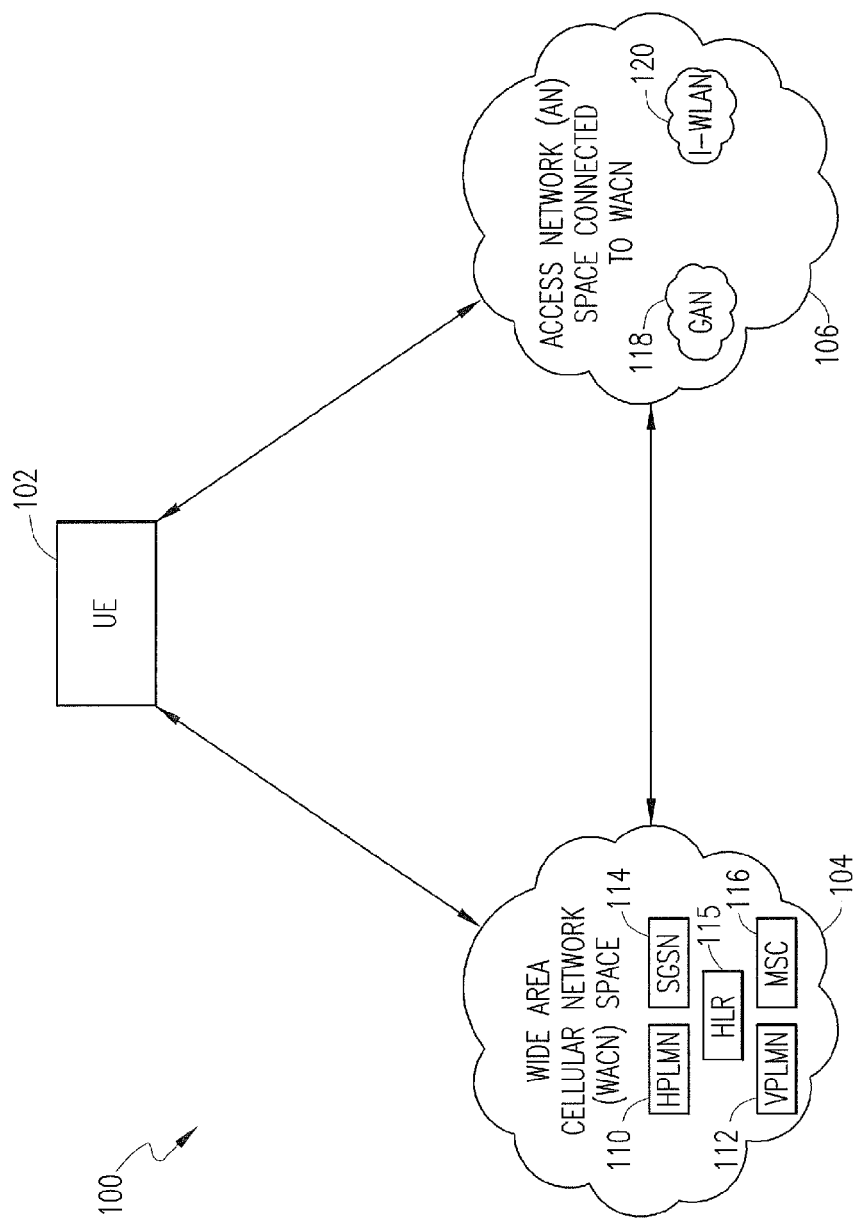
FIG. 1 depicts a generalized network environment wherein an embodiment of the present patent disclosure may be practiced.

A scheme is provided for acquiring network advertisement information in a network environment having one or more radio access networks (RANs), one or more core networks (CNs) and one or more service networks (SNs). A combination of codes is provided to a wireless user equipment (UE) device for facilitating discovery of applicable RAN-CN-SN combinations and subsequent network selection by the UE device.

In one embodiment, the present disclosure is directed to a network advertisement method operable in a network environment having one or more RANs, one or more CNs and one or more SNs, comprising: broadcasting an advertisement message by each RAN on a broadcast control channel associated therewith, the advertisement message including a combination of identification codes, wherein each combination comprises (i) an identification code associated with each particular RAN available to the wireless UE device, (ii) an identification code associated with a CN that is supported by the particular RAN, and (iii) an identification code associated with an SN that is supported by a particular CN; and receiving each advertisement message by a wireless UE device in a scanning procedure for facilitating network selection based at least in part upon the combination of identification codes.

In another embodiment, the present disclosure is directed to a network advertisement system operable in a network environment having one or more RANs, one or more CNs, and one or more SNs, comprising: means associated with each RAN for broadcasting an advertisement message on a broadcast control channel for reception by a wireless UE device; and means for including in the advertisement message a combination of identification codes, wherein each combination comprises (i) an identification code associated with each particular RAN available to the wireless UE device, (ii) an identification code associated with a CN that is supported by the particular RAN, and (iii) an identification code associated with an SN that is supported by a particular CN.

In a still further embodiment, the present disclosure is directed to a method of acquiring network advertisement information in a network environment, comprising: scanning by a wireless UE device in a frequency band for discovering available radio access networks; upon selecting a particular RAN, authenticating by the wireless UE device with an authentication server; upon successful authentication, obtaining an Internet Protocol (IP) address of a network advertisement broker (NAB) from a domain name server (DNS); contacting the NAB by the wireless UE device using the IP address; and obtaining network advertisement information from the NAB.

In yet another embodiment, the present disclosure is directed to a system for acquiring network advertisement information in a network environment, comprising: means associated with a wireless UE device for scanning in a frequency band for discovering available radio access networks; means for authenticating the wireless UE device with an authentication server; means, operable responsive to successful authentication of the wireless UE device, for obtaining an IP address of a NAB from a DNS; and means associated with the wireless UE equipment for contacting the NAB using the IP address and obtaining network advertisement information from the NAB.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary generalized network environment 100 wherein an embodiment of the present patent disclosure may be practiced. A user equipment (UE) device 102 may comprise any portable computer (e.g., laptops, palmtops, or handheld computing devices) or a mobile communications device (e.g., cellular phones or data-enabled handheld devices capable of receiving and sending messages, web browsing, et cetera), or any enhanced personal digital assistant (PDA) device or integrated information appliance capable of email, video mail, Internet access, corporate data access, messaging, calendaring and scheduling, information management, and the like, that is preferably operable in one or more modes of operation and in a number of frequency bands. For example, UE device 102 may operate in the cellular telephony band frequencies as well as Wireless Local Area Network (WLAN) bands. Further, other bands in which the UE device could operate wirelessly may comprise Wi-Max bands or one or more satellite bands. By way of illustration, the network environment 100 is envisioned as two broad categories of communication spaces capable of providing service to UE device 102 wherein acquisition of network advertisement information may be accomplished in accordance with the teachings set forth herein. In wide area cellular network (WACN) space 104, there may exist any number of Public Land Mobile Networks (PLMNs) that are operable to provide cellular telephony services which may or may not include packet-switched data services. Depending on the coverage area(s) and whether the user is roaming, WACN space 104 can include a number of home networks 110 (i.e., home PLMNs or HPLMNs, or equivalent HPLMNs or EHPLMNs), visited networks (i.e., VPLMNs) 112, each with appropriate infrastructure such as Home Location Register (HLR) nodes 115, Mobile Switching Center (MSC) nodes 116, and the like. Since the WACN space 104 may also include a General Packet Radio Service (GPRS) network that provides a packet radio access for mobile devices using the cellular infrastructure of a Global System for Mobile Communications (GSM)-based carrier network, a Serving GPRS Support Node (SGSN) 114 is exemplified therein. Additionally, by way of generalization, the PLMNs of the WACN space 104 may comprise radio access and core networks selected from the group comprising Enhanced Data Rates for GSM Evolution (EDGE) networks, Integrated Digital Enhanced Networks (IDENs), Code Division Multiple Access (CDMA) networks, Time Division Multiple Access (TDMA) networks, Universal Mobile Telecommunications System (UMTS) networks, or any 3rd Generation Partnership Project (3GPP)-compliant network (e.g., 3GPP or 3GPP2), all operating with well known frequency bandwidths and protocols.

Further, UE device 102 is operable to obtain service from an access network (AN) space 106 that is connected to the WACN space 104. In one implementation, the AN space 106 includes one or more generic access networks (GANs) 118 as well as any type of wireless LAN (WLAN) arrangements 120, both of which may be generalized as any wireless AN that is operable to provide access services between UE device 102 and a PLMN core network using a broadband Internet Protocol (IP)-based network. WLAN arrangements 120 provide short-range wireless connectivity to UE device 102 via access points (APs) or "hot spots," and can be implemented using a variety of standards, e.g., IEEE 802.11b, IEEE 802.11a, IEEE 802.11g, HiperLan and HiperLan II standards, Wi-Max standard, OpenAir standard, and the Bluetooth standard.

In one embodiment, interfacing between the WACN and AN spaces may be effectuated in accordance with certain standards. For instance, GAN 118 may be interfaced with one or more PLMNs using the procedures set forth in the 3GPP TR 43.901 and 3GPP TS 43.xxx documents as well as related documentation. Likewise, WLAN 120 may be interfaced with at least one PLMN core using the procedures set forth in the 3GPP TS 22.234, 3GPP TS 23.234 and 3GPP TS 24.234 documents as well as related documentation, and may therefore be referred to as an Interworking WLAN (I-WLAN) arrangement.

Based on the foregoing, it should be recognized that the service infrastructure of the network environment 100 may be generalized into three broad segments: one or more radio access network (RANs) (which can include cellular band technologies as well as WLAN technologies), one or more core networks (CNs), and one or more service network (SNs). Depending on network ownership arrangements and service-level agreements, each RAN may support one or more CNs, each of which in turn may support one or more SNs. Such combinations of infrastructure equipment across multiple owners are sometimes used to create Mobile Virtual Network Operators (MVNOs). The teachings of the present patent disclosure are equally applicable to MVNOs as to PLMNs. Since each RAN, CN, or SN may be provided with its own network identifier (ID code), and further because of the numerous RAN-CN-SN combinations available in the network environment 100, traditional broadcasting of a single broadcast identifier for providing network advertisement information becomes unworkable.

Figure 2:
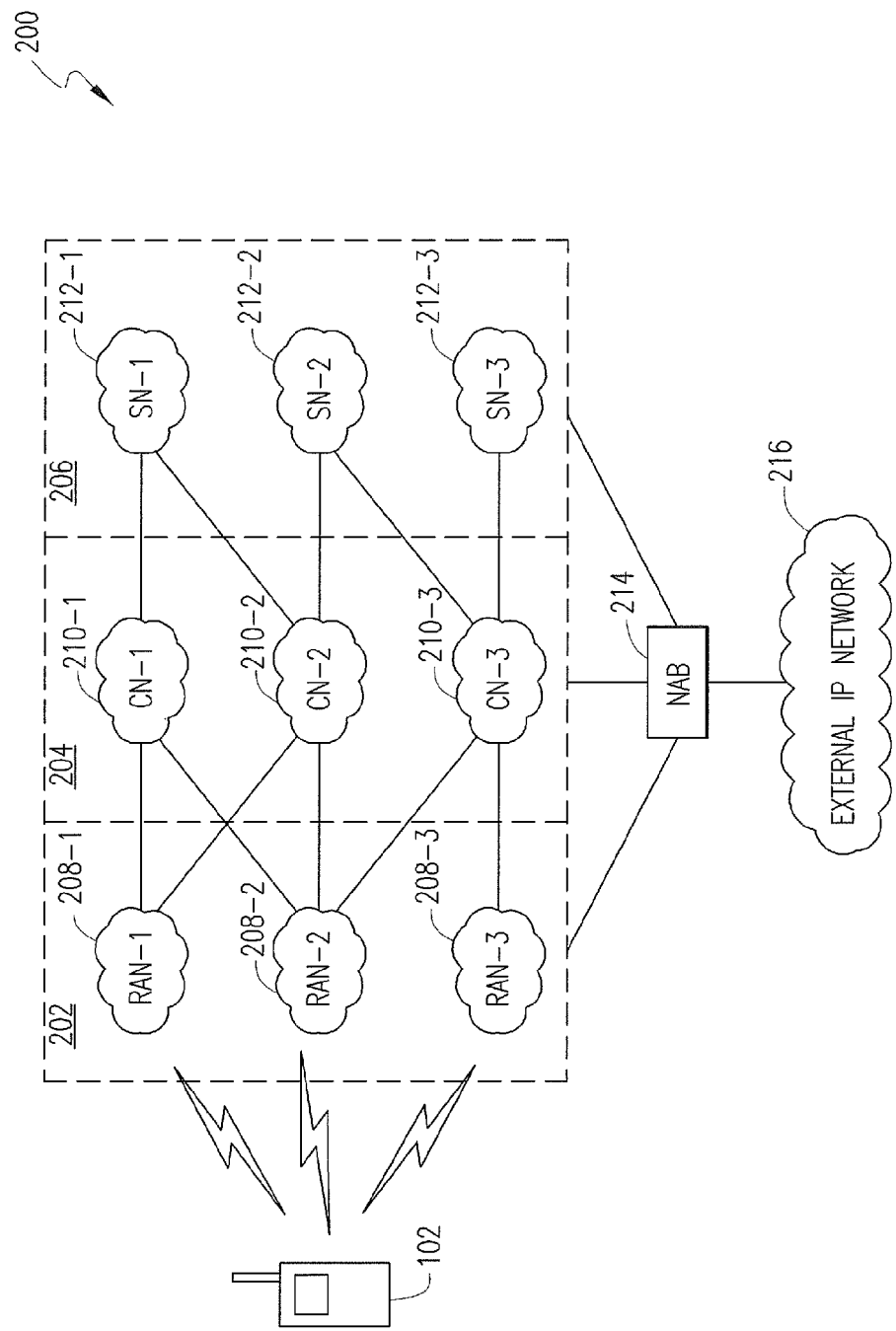
FIG. 2 depicts an exemplary embodiment of a network environment where a wireless user equipment (UE) device is operably disposed for acquiring network advertisement information in accordance with the teachings of the present patent disclosure.

To formalize the teachings of the present disclosure, reference is now taken to FIG. 2 wherein an exemplary embodiment of a network environment 200 is shown that is a more concrete subset of the generalized network environment 100 illustrated in FIG. 1. As depicted, wireless UE device 102 is operably disposed for acquiring network advertisement information from a RAN segment 202 that is coupled to a CN segment 204 which in turn is coupled to an SN segment 206. Three RANs are illustrative: RAN-1 208-1, RAN-2 208-2 and RAN-3 208-3, which are identified with the network codes MANC1, MANC2 and MANC3, respectively. The CN segment 204 is also illustrated with three CNs: CN-1 210-1 (having an ID code of MCNC1), CN-2 210-2 (having an ID code of MCNC2) and CN-3 210-3 (having an ID code of MCNC3). Likewise, the SN segment 206 is illustrated with SN-1 212-1 (having an ID code of MSNC1), SN-2 212-2 (having an ID code of MSNC2) and SN-3 212-3 (having an ID code of MSNC3).

By way of example, RAN-1 208-1 is operable to support connectivity to two CNs, CN-1 210-1 and CN-2 210-2. In similar fashion, RAN-2 208-2 supports three CNs and RAN-3 208-3 supports only one CN. Each CN supports connectivity to one or more SNs: e.g., CN-3 210-3 connects to SN-2 212-2 as well as SN-3 212-3. Given the interconnectivity of the RAN/CN/SN segments, several combinations of identification codes may be obtained for purposes of uniquely identifying the various RAN-CN-SN combinations that the wireless UE device 102 can potentially discover and select from. For instance, with a suitable Mobile Country Code (MCC) being included, the three ID code combinations associated with RAN-1 208-1 are:

[MCC.MANC1.MCNC1.MSNC1];
[MCC.MANC1.MCNC1.MSNC2]; and
[MCC.MANC1.MCNC2.MSNC2].

Likewise, the ID code combinations associated with RAN-2 208-2 are:

[MCC.MANC2.MCNC1.MSNC1];
[MCC.MANC2.MCNC1.MSNC2];
[MCC.MANC2.MCNC2.MSNC2];
[MCC.MANC2.MCNC3.MSNC2]; and
[MCC.MANC2.MCNC3.MSNC3].

The two ID code combinations associated with RAN-208-3 are: [MCC.MANC3.MCNC3.MSNC2] and [MCC.MANC3.MCNC3.MSNC2]. As will be described in detail hereinbelow, a number of options are available for providing the applicable network ID code information to the UE device 102 either in an initial scan procedure (i.e., when the device is not registered on any networks) or in a background scan procedure (i.e. when the device is registered on a network).

Further, a network advertisement broker (NAB) entity 214 is disposed in the network environment 200 that is operable as a depository of various RAN-CN-SN ID code combinations as well as information relating to supported services, capabilities, et cetera, on a network-by-network basis. For instance, a database structure associated with NAB 214 can contain RAN IDs, CN IDs to which each RAN is connected, services supported by each RAN, other access networks supported or operated by a RAN (which could be any radio technology such as 3GPP, 3GPP2, or any IEEE-based WLAN, as alluded to in the foregoing discussion), and the like, any or all of which information may be updated periodically or as needed. Additionally, depending on implementation, NAB 214 may be associated with a RAN, a CN, or an SN, or in any combination thereof. In a still further embodiment, NAB 214 may be provided as a third-party entity accessible via a public packet-switched Internet Protocol (IP) network 216, e.g., the Internet.

Referring now to FIG. 3, depicted therein is an exemplary database structure 300 provided as part of a network advertisement broker (NAB) in accordance with the teachings of the present patent disclosure. Based on the scope of coverage of the database as well as any third-party commercial arrangements, the database structure 300 may be provisioned with the data pertaining to a fairly large number of RANs. Reference numeral 302 refers to one or more RANs identified by their RAN ID codes. Services supported by each RAN are identified in column 304. For example, RAN-1 is operable to support High Speed Datalink Packet Access (HSDPA), EDGE, and the like. Cross-relationship or interoperability of a particular RAN with other access networks is indicated in column 306. As illustrated, RAN-1 interoperates with additional RANs, RAN-X, RAN-Y, and RAN-Z, as well as WLANs, WLAN-A and WLAN-C. Reference numeral 308 refers to the core networks supported by each particular RAN identified in column 302. Reference numeral 310 refers to the various services supported by each CN, such as, e.g., IP Multimedia Subsystem (IMS), Presence, Push-to-Talk over Cellular (PoC), and the like.

In accordance with the teachings of the present patent disclosure, at least three options are available for providing network advertisement information (i.e., information indicating which networks and network combinations are available to a wireless device):

Broadcast on a per RAN basis. In this option, existing broadcast messages may be expanded or additional broadcast messages be created to carry the combinations of network ID codes.

Broadcast all available networks and network combinations via a beacon channel which may be provided by a third-party, e.g., a public body, a consumer group, etc.

Provided via querying a NAB entity.

Figure 4:
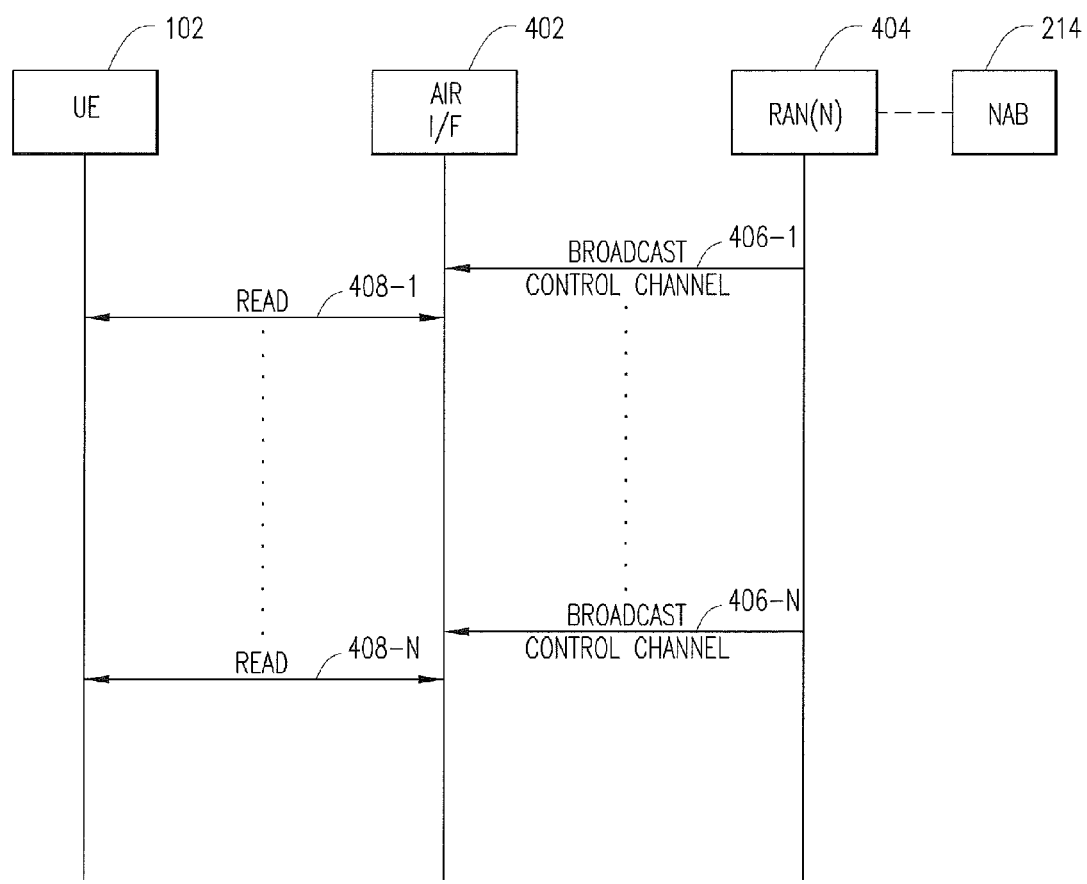
FIG. 4 depicts an exemplary message flow diagram of the present patent disclosure for acquiring network advertisement information according to one embodiment.

FIG. 4 depicts an exemplary message flow diagram of the present patent disclosure for acquiring network advertisement information according to one embodiment where advertisement messages are broadcast from RANs. One or more RANs 404 are operable to broadcast information via associated control channels over the air interface 402. In one arrangement, the RAN nodes 404 may comprise Base Transceiver Station (BTS) nodes deployed in various cellular networks. Reference numerals 406-1 through 406-N refer to the control channel messages that are broadcast by the network nodes at a designated repetition rate. In one implementation, the broadcast information may include network ID code combination information, capability information, adjacent cell information, among other types of information. UE 102 is operable to read the broadcast information over the air interface 402 and based at least in part upon the received advertisement information, appropriate network selection may be carried out which may be mediated through application of such preferences and prohibitions as may be configured by the subscriber, network operators, and the like.

In one implementation, the various RAN-CN-SN ID code combinations may be transmitted in their entirety. That is, each RAN-CN-SN ID code combination is completely resolved and transmitted explicitly. For example, each of the three combinations [MCC.MANC1.MCNC1.MSNC1]; [MCC.MANC1.MCNC1.MSNC2]; and [MCC.MANC1.MCNC2.MSNC2] provided in association with RAN-1 of FIG. 2 may be broadcast by RAN-1 in complete form. In another implementation, each CN may advertise all SN ID codes it supports. For instance, the [MCC.MANC1.MCNC1.MSNC1:MSNC2] combination format indicates that both MSNC1 and MSNC2 are supported by the CN identified by MCNC1.

As alluded to before, for each network there is a corresponding broadcast message that defines the services that are available. In one aspect, UE 102 can also request the services information by transmitting a particular ID code combination (e.g., [MCC.MANC1.MCNC1.MSNC2]) to the appropriate network node to obtain such information. Additionally, the ID code information as well as the services information may be provided to the individual RANs by one or more NABs for broadcasting.

Figure 5:
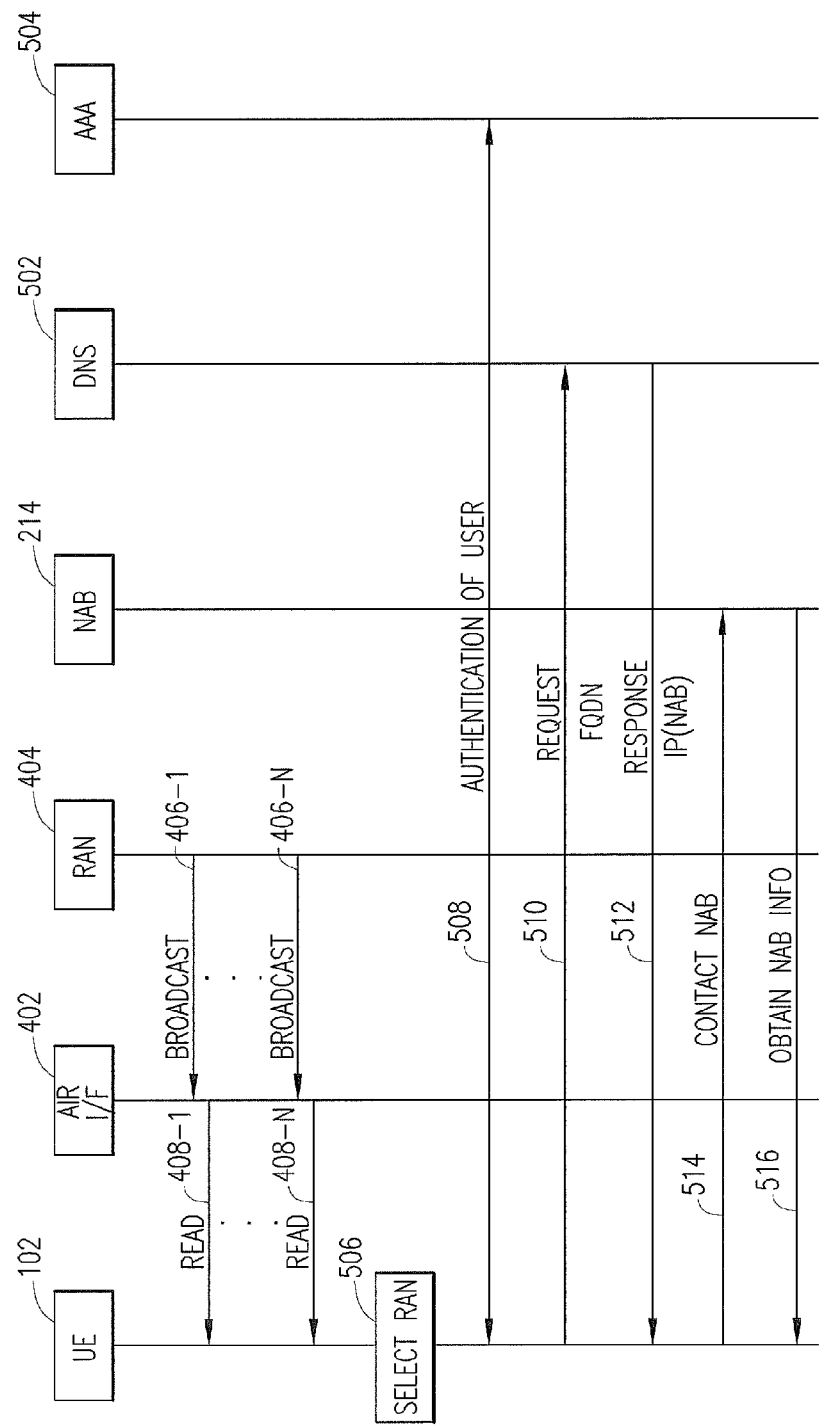
FIG. 5 depicts an exemplary message flow diagram of the present patent disclosure for acquiring network advertisement information according to another embodiment.

FIG. 5 depicts an exemplary message flow diagram of the present patent disclosure for acquiring network advertisement information according to another embodiment. As before, UE 102 is operable to read broadcast messages over the air interface 402 from the individual RANs. Using such applicable selection filters (e.g., positive filters (i.e., preferences) as well as negative filters (i.e., prohibitions)) as may be configured on the device, a particular RAN may be selected (block 506). Thereafter, the device/user is authenticated by engaging in an authentication mechanism 508 with an Authentication, Authorization and Accounting (AAA) server 504. Upon successful authentication, the RAN is operable to permit the device to contact a suitable NAB, e.g., NAB 214, using the NAB's IP address. In one implementation, the IP address may be obtained via a Fully Qualified Domain Name (FQDN) query initiated by the device, wherein the FQDN is constructed using the RAN's a Mobile Country Code (MCC) and Mobile Network Code (MNC). In another implementation, the AAA server 504 may provide the IP address or FQDN. Reference numerals 510 and 512 refer to a IP address request via FQDN query to a domain name server (DNS) 502 and the response therefrom. Once the NAB's IP address is available to UE device 102, it then contacts NAB 214 via a request message 514 and obtains the requisite NAB information via a reply 516. As part of the request message 514, UE device 102 may include any or all of the following data: subscriber ID (e.g., International Mobile Subscriber Identity (IMSI) which is constructed as [MCC][MNC][MIN] in GSM, where [MCC] identifies the country that the subscriber is from, [MNC] identifies the PLMN network, and [MIN] is the unique ID that identifies the wireless UE device), network ID, (e.g., Cell Global Identification (CGI) or System Identification (SID)), network IDs of other networks, location information of the wireless UE device (e.g., Global Positioning System or GPS coordinates), media access control (MAC) addresses of available access points, and MAC address of the wireless UE device.

As part of the reply message 516, NAB 214 is operable to transmit the stored RAN-CN-SN ID information as well as the services and capabilities associated therewith. Based on the geographic location information of the wireless UE device, the NAB information may be appropriately customized. Upon receipt of the requisite information, the wireless UE device 102 may store it locally.

Figure 6:
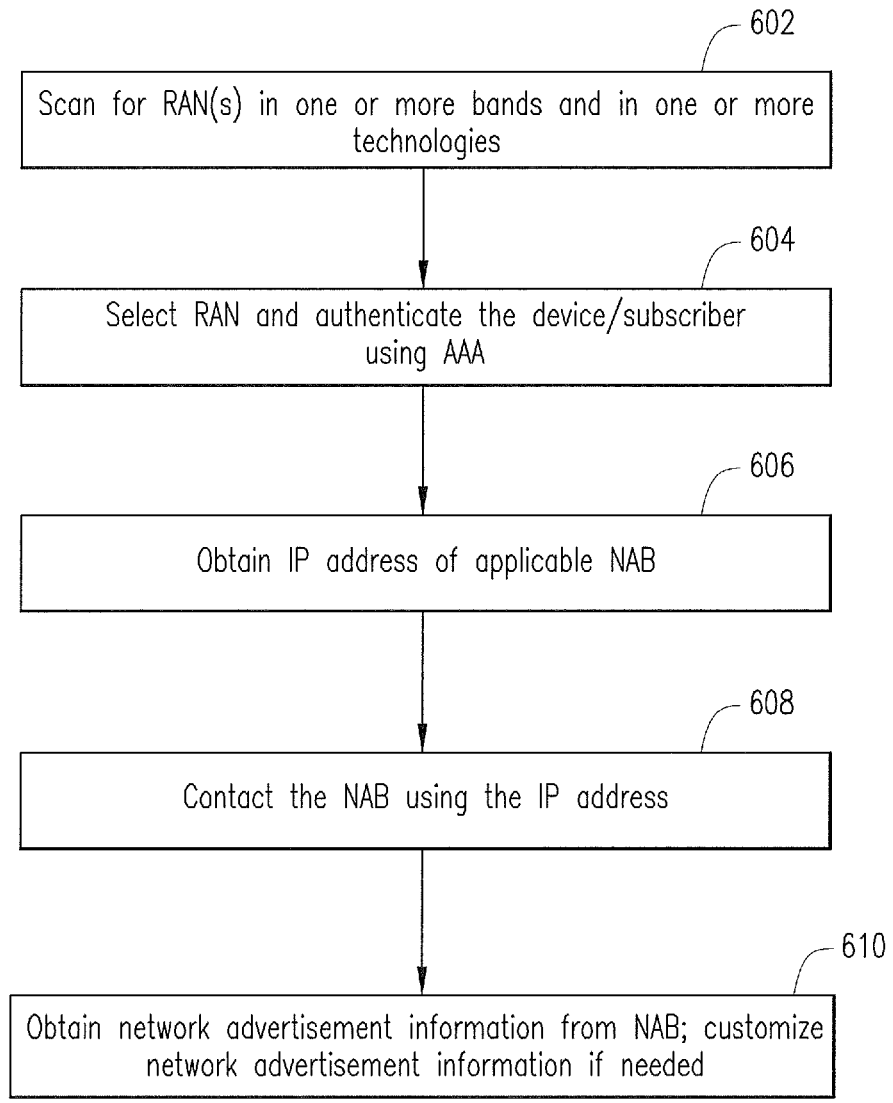
FIG. 6 is a flowchart associated with a method of the present patent disclosure.

FIG. 6 is a flowchart associated with an embodiment of the method described hereinabove. At block 602, the wireless UE device is operable to scan for available RANs including WLANs in one or more frequency bands and in one or more radio access technologies, depending on the device configuration, et cetera. For example, it is possible to configure the wireless UE device for a number of technology modes that are used, wherein the configuration information may be stored as an elementary file (EF) structure on a Subscriber Identity Module (SIM) card or Removable User Identity Module (RUIM) card operable with the device. Other removable memory forms may include compact Flash, secure SD, et cetera. In another embodiment, such data could be stored in a fixed memory module integrated with the device and/or as part of a managed object information tree. Additionally, the device configuration data may be modified by the network operator via an Over the Air (OTA) mechanism such as Short Message Service (SMS), Cell Broadcast, Multimedia Broadcast/Multicast Service (MBMS), or Unstructured Supplementary Service Data (USSD). In a still further embodiment, it may be possible for the subscriber to modify the device configuration data.

Given the diversity of the exemplary network environment 100 described earlier with respect to FIG. 1, it is envisaged that scanning may be effectuated in a frequency band in which at least one of the following technologies is operating: GERAN (without EDGE), GERAN (with EDGE), an IDEN network, a CDMA/CDMA2000/TDMA network, a UMTS network, and so on. Additionally, scanning may be effectuated in a frequency band compliant with a WLAN standard selected from: IEEE 802.11b standard, IEEE 802.11a standard, IEEE 802.11g standard, HiperLan standard, HiperLan II standard, Wi-Max standard, OpenAir standard, and Bluetooth standard. Further, the UE device includes logic for selecting a RAN based at least in part upon the network information obtained via scanning. Thereafter, an authentication mechanism using AAA is employed for authenticating the device and subscriber (block 604). The IP address of suitable NAB is obtained using, e.g., FQDN (block 606). Subsequently, the NAB is contacted using the IP address obtained in block 606, whereupon appropriate network advertisement information including services/capabilities information may be obtained from the NAB. As alluded to previously, such information may be customized based on the geographic location of the device, for example. These operations are illustrated in blocks 608 and 610.

Figure 7:
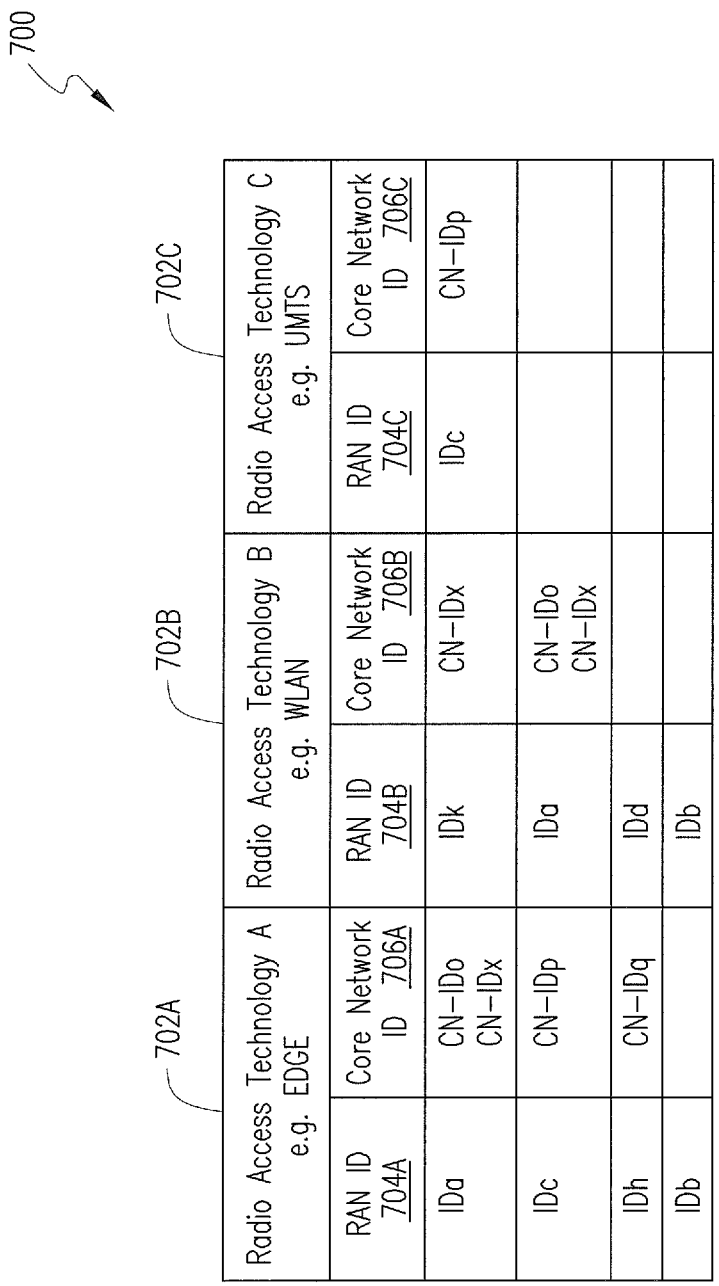
FIG. 7 depicts an exemplary database structure that may be provided as an operated-based list, a user-based list or an enterprise-based list for configurably setting network selection preferences and prohibitions according to the teachings of the present patent disclosure.

FIG. 7 depicts an exemplary database structure 700 that may be provided as an operated-based list, a user-based list or an enterprise-based list, or any combination thereof, for configurably setting network selection preferences and prohibitions according to one aspect of the present patent disclosure. In one embodiment, the database structure 700 is configured as an operator-defined network list that specifies a plurality of network IDs which should be considered as preferred networks in one or more radio access technologies, wherein the network IDs are populated by the operator. In another embodiment, the database structure 700 may be configured as one or more user network lists, with one list per user using the wireless UE device, for example. Each such list may be accessed by the users upon identifying themselves to the device, wherein the contents of the list (i.e., network IDs) are populated by the respective users. In yet another embodiment, the database structure 700 may be configured as a list of network IDs that are preferred by an enterprise owning the wireless devices for the benefit of its employee-users.

Irrespective of the particular configuration, the database structure 700 defines a plurality of radio access technologies, e.g., EDGE technology 702A, WLAN technology 702B, and UMTS technology 702C, wherein a number of RAN IDs are provided for each technology. As illustrated in FIG. 7, column 704A identifies multiple RAN IDs for the EDGE technology, each RAN supporting one or more core networks identified in corresponding column 706A. Likewise columns 704B/706B and columns 704C/706C are provided for the WLAN and UMTS technologies respectively. As one skilled in the art may appreciate, the various IDs can be Service Set IDs (SSIDs) (for WLAN), SIDs (for IS-95 and IS-136), or [MCC, MNC] combinations (for GSM).

Similar to the network preference lists set forth above, an analogous database structure may be provided that identifies one or more networks that are forbidden for use. Such a list of prohibited networks may be configured as, for example, an operator-barred RAN list (i.e., specified by an operator), enterprise-barred RAN list (i.e., specified by an enterprise), operator-barred CN list (i.e., specified by an operator), and enterprise-barred CN list (i.e., specified by an enterprise).

In addition to one or more of the embodiments and configurations of the database structures identifying network preferences and prohibitions, one or more home network lists (including equivalent home networks) may be provided for facilitating network selection in conjunction with a network entity referred to as a roaming broker (RB). Additional details regarding RB provisioning and its interaction with a NAB may be found in the following commonly owned co-pending U.S. patent application Ser. No. 11/116,141 entitled "NET- WORK SELECTION SCHEME USING A ROAMING BROKER (RB)," filed even date herewith and cross-referenced hereinabove.

Given that there are a number of lists that could be used in the radio part, appropriate intelligence or logic may be provided as part of the wireless UE device in order to resolve priority among various radio access technologies, preferences and prohibitions. Where the wireless device is operable in multiple modes (i.e., in different technologies), a particular mode may be designated as its primary operating mode (highest priority). Secondary and tertiary operating modes may be accorded lower priorities accordingly. Again, it is envisaged that the operating modes may be configured or reconfigured dynamically, based on operator-defined criteria, subscriber-defined criteria, or enterprise-defined criteria. Some exemplary parameters used in controlling the operating mode may be: device location information (e.g., GPS information), SSIDs, SIDs, [MCC,MNC] combinations, cell IDs, and the like. Additionally, certain override criteria may be provided for operators, enterprises or subscribers (i.e., for hard set). In one implementation, the interaction of these parameters defines when a particular technology takes either primary, secondary, or tertiary operating mode. Each defined parameter may be provisioned with a flag associated therewith, indicating whether the defined condition has to occur in order to set an operating mode. For example, consider that the wireless UE device discovers a specific cell ID upon performing an initial scan. It is assumed that the subscriber has defined the condition that if a home SSID is found in this cell, WLAN is to be set as the primary operating mode. Accordingly, the device's primary mode would be set to WLAN in this particular cell provided the home SSID has been found and the secondary mode may be set to GSM.

Figure 8A:
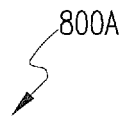
FIGS. 8A-8C depict exemplary database structures for facilitating configuration of the operation of a wireless UE device.
Figure 8B:
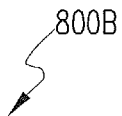
Figure 8C:
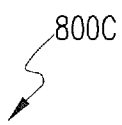

As pointed out earlier, the provisioning of various preferred and barred network lists necessitates appropriate device logic for specifying the order in which to use them. Moreover, each country may have its own regulatory requirements as to which list should take precedence. An enterprise company for instance may forbid access to a public WLAN access point that operates in the vicinity of the company's premises. Additionally, certain device logic may be necessary for specifying the scanning behavior as well, since there may be a number of bands on per-technology basis in which the device is capable of scanning. FIGS. 8A-8C depict exemplary database structures or logic for facilitating configuration of the operation of a wireless UE device. In particular, reference numeral 800A of FIG. 8A refers to a list ordering scheme operable with the device wherein a priority is imposed on the device's various network lists. In FIG. 8B, reference numeral 800B refers to a scheme for specifying initial scan behavior of the device. As illustrated, when the device performs an initial scan, it is provided that Technology A should be scanned in bands A, B, and C. In a GSM implementation, these bands could be selected from 850 MHz, 900 MHz, 1800 MHz, and 1900 MHz. Likewise, Technology B could be CDMA (IS-95) operating in two bands, 850 MHz and 1900 MHz. Although each technology is exemplified with one or more frequency bands in scheme 800B, it should be realized that there may be a technology available with the wireless device in which no scanning bands are specified (e.g., by setting an on/off flag associated with that particular technology or by explicitly not provisioning any band information). Further, the scanning order may be effectuated in serial mode or in parallel mode.

An exemplary initial scan procedure is set forth in the following:

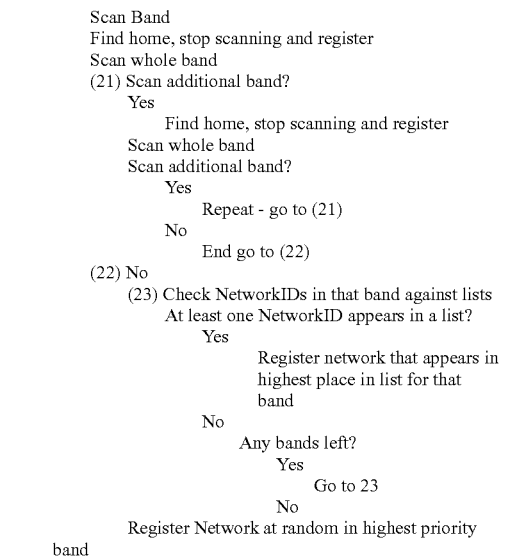

In similar fashion, reference numeral 800C in FIG. 8C refers to a scheme for specifying the device's background scan behavior. As exemplified, when the device performs a background scan, it is provided that Technology A should be scanned in bands A and C. Likewise, Technology B may be scanned in bands D and G. Analogous to the initial scanning process logic, the background scanning scheme 800C may have technologies with no band information provided therefor. As to the background scan interval, it may be configured on the device on a technology-by-technology basis or with a single for all technologies. In addition, such configuration data may be provided within a fixed memory module of the device or by way of a removable module (e.g., SIM, RUIM, compact Flash, USIM, et cetera).

An exemplary background scan procedure is set forth in the following:

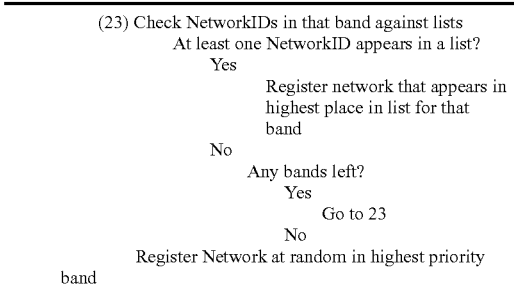

Figure 9:
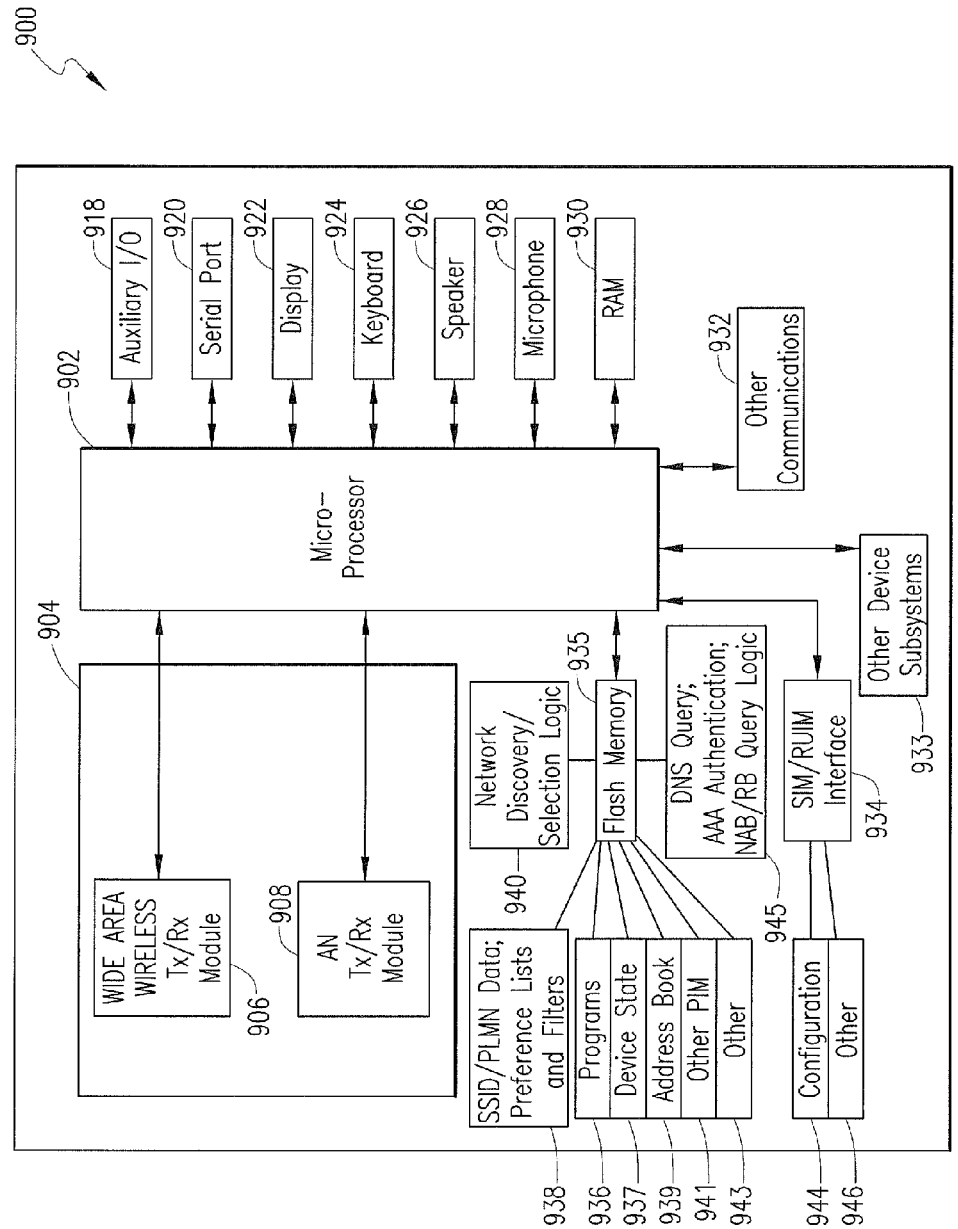
FIG. 9 depicts a block diagram of an embodiment of a wireless UE device operable to acquire network advertisement information according to the teachings of the present patent disclosure.

FIG. 9 depicts a block diagram of an embodiment of a wireless device 900 operable to acquire network advertisement information according to the teachings of the present patent disclosure. It will be recognized by those skilled in the art upon reference hereto that although an embodiment of UE 102 may comprise an arrangement similar to one shown in FIG. 9, there can be a number of variations and modifications, in hardware, software or firmware, with respect to the various modules depicted. Accordingly, the arrangement of FIG. 9 should be taken as illustrative rather than limiting with respect to the embodiments of the present patent disclosure. A microprocessor 902 providing for the overall control of UE 900 is operably coupled to a communication subsystem 904 which includes transmitter/receiver (transceiver) functionality for effectuating multi-mode communications over a plurality of bands. By way of example, a wide area wireless Tx/Rx module 906 and a wireless AN Tx/Rx module 908 are illustrated. Although not particularly shown, each Tx/Rx module may include other associated components such as one or more local oscillator (LO) modules, RF switches, RF bandpass filters, A/D and D/A converters, processing modules such as digital signal processors (DSPs), local memory, etc. As will be apparent to those skilled in the field of communications, the particular design of the communication subsystem 904 may be dependent upon the communications networks with which the UE device is intended to operate. In one embodiment, the communication subsystem 904 is operable with both voice and data communications.

Microprocessor 902 also interfaces with further device subsystems such as auxiliary input/output (I/O) 918, serial port 920, display 922, keyboard 924, speaker 926, microphone 928, random access memory (RAM) 930, a short-range communications subsystem 932, and any other device subsystems generally labeled as reference numeral 933. To control access, a SIM/RUIM interface 934 is also provided in communication with the microprocessor 902. In one implementation, SIM/RUIM interface 934 is operable with a SIM/RUIM card having a number of key configurations 944 and other information 946 such as identification and subscriber-related data as well as one or more SSID/PLMN lists and filters described in detail hereinabove.

Operating system software and other control software may be embodied in a persistent storage module (i.e., non-volatile storage) such as Flash memory 935. In one implementation, Flash memory 935 may be segregated into different areas, e.g., storage area for computer programs 936 as well as data storage regions such as device state 937, address book 939, other personal information manager (PIM) data 941, and other data storage areas generally labeled as reference numeral 943. Additionally, appropriate network discovery/selection logic 940 may be provided as part of the persistent storage for executing the various procedures, NAB information acquisition techniques, and network selection mechanisms set forth in the preceding sections. Logic for effectuating appropriate DNS queries, authentication, and NAB/RB queries is also exemplified as a logic module 945. Associated therewith is a storage module 938 for storing the SSID/PLMN lists, selection/scanning filters, capability indicators, et cetera, also described in detail hereinabove.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present invention as set forth in the following claims.

What is claimed is:

1. A method operable on a wireless user equipment (UE) device, comprising:
    storing network information in a database structure on said wireless user equipment device, said network information containing a plurality of network entries arranged by radio access technology, wherein at least a portion of the plurality of the network entries comprise both a radio access network (RAN) identification code and a core network (CN) identification code associated therewith and having a priority within the radio access technology and further wherein a first network entry of the plurality of network entries comprises a CN identification code associated with two or more RAN identification codes and RANs represented by the two or more RAN identification codes operate in at least two different radio access technologies;
    determining a currently preferred order of access technologies; and
    selecting a network entry according to the currently preferred order of radio access technologies and the priority of network entries within the radio access technologies.

2. The method as recited in claim 1, wherein a first network entry of the plurality of network entries comprises a RAN identification code associated with two or more CN identification codes.

3. The method as recited in claim 1, wherein the plurality of network entries comprises prohibited networks.

4. The method as recited in claim 1, wherein the plurality of network entries comprises both preferred networks and prohibited networks.

5. The method as recited in claim 1, wherein the database structure is enterprise-controlled.

6. The method as recited in claim 1, further comprising determining an order of priority for use of the plurality of structures.

7. The method as recited in claim 1, further comprising applying a policy in determining the currently preferred order of access technologies.

8. The method as recited in claim 7, wherein an enterprise policy prohibits use of a given WLAN near enterprise premises.

9. A wireless user equipment (UE) device, comprising:
    a processor operably coupled to a memory and a transceiver;
    a logic module for storing network information in a database structure on said wireless user equipment device, said network information containing a plurality of network entries arranged by radio access technology, wherein at least a portion of the plurality of the network entries comprise both a radio access network (RAN) identification code and a core network (CN) identification code associated therewith and having a priority within the radio access technology and further wherein a first network entry of the plurality of network entries comprises a CN identification code associated with two or more RAN identification codes and RANs represented by the two or more RAN identification codes operate in at least two different radio access technologies;
    a logic module for determining a currently preferred order of access technologies; and
    a logic module for selecting a network entry according to the currently preferred order of radio access technologies and the priority of network entries within the radio access technologies;
    wherein the logic modules are embodied in any of hardware, firmware and software stored in the memory.

10. The wireless UE device as recited in claim 9, wherein a first network entry of the plurality of network entries comprises a RAN identification code associated with two or more CN identification codes.

11. The wireless UE device as recited in claim 9, wherein the plurality of network entries comprises prohibited networks.

12. The wireless UE device as recited in claim 9, wherein the plurality of network entries comprises both preferred networks and prohibited networks.

13. The wireless UE device as recited in claim 9, wherein the database structure is enterprise-controlled.

14. The wireless UE device as recited in claim 9, further comprising a logic module for determining an order of priority for use of the plurality of structures.

15. The wireless UE device as recited in claim 9, further comprising a logic module for applying a policy in determining the currently preferred order of access technologies.

16. The wireless UE device as recited in claim 9, wherein an enterprise policy prohibits use of a given WLAN near enterprise premises.

* * * * *

UNITED STATES PATENT AND TRADEMARK OFFICE
CERTIFICATE OF CORRECTION

PATENT NO. : 8,818,449 B2
APPLICATION NO. : 13/282020
DATED : August 26, 2014
INVENTOR(S) : Adrian Buckley et al.

It is certified that error appears in the above-identified patent and that said Letters Patent is hereby corrected as shown below:

In the Specification

Column 1, Line 5, "35 U.S.C. §119(e)" should read -- 35 U.S.C. §120 --.

Column 5, Line 27, "RAN-" should read -- RAN-3 --.

Signed and Sealed this
Nineteenth Day of May, 2015

Michelle K. Lee
*Director of the United States Patent and Trademark Office*